(12) United States Patent
Linton et al.

(10) Patent No.: US 10,915,642 B2
(45) Date of Patent: *Feb. 9, 2021

(54) PRIVATE ANALYTICS USING MULTI-PARTY COMPUTATION

(71) Applicant: International Business Machines Corporation, Armonk, NY (US)

(72) Inventors: Jeb R. Linton, Manassas, VA (US); Dennis Kramer, Siler City, NC (US); Irma Sheriff, Whitby (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/202,355

(22) Filed: Nov. 28, 2018

(65) Prior Publication Data

US 2020/0167483 A1 May 28, 2020

(51) Int. Cl.
*G06F 21/60* (2013.01)
*H04L 9/32* (2006.01)
(Continued)

(52) U.S. Cl.
CPC .............. *G06F 21/602* (2013.01); *G06F 8/41* (2013.01); *G06F 21/604* (2013.01); *H04L 9/0861* (2013.01); *H04L 9/3213* (2013.01)

(58) Field of Classification Search
CPC ........ G06F 21/602; G06F 21/604; G06F 8/41; H04L 9/3213; H04L 9/0861
See application file for complete search history.

(56) References Cited

U.S. PATENT DOCUMENTS 8,695,101 B2 * 4/2014 Bajaj ...................... G06Q 10/00
726/2
9,449,191 B2 9/2016 MacCarthy et al.
(Continued)

FOREIGN PATENT DOCUMENTS

CN 108418676 A 8/2018
CN 108549824 A 9/2018
(Continued)

OTHER PUBLICATIONS

Disclosed Anonymously, "Secret relations between data to protect sensitive data", IP.com No. IPCOM000230160D, IP.com Electronic Publication Date: Aug. 23, 2013, 6 pages.
Disclosed Anonymously, "A method and system for anonymizing and de-anonymizing data in a hybrid cloud solution", IP.com No. IPCOM000238512D, IP.com Electronic Publication Date: Sep. 1, 2014, 3 pages.
(Continued)

*Primary Examiner* — Mohammed Waliullah
(74) *Attorney, Agent, or Firm* — Peter Edwards

(57) ABSTRACT

A method, system, and computer program product for performing strong desensitization of sensitive data within a garbled circuit includes: compiling a predetermined program into a first program, where the compiled first program is encoded in a form of a garbled circuit, and where the predetermined program runs on sensitive data; and executing the first program, where executing the first program includes: executing an analytics function using tokenized data with a first set of sensitive information and analytics data with a second set of sensitive information, where the tokenized data originated from a data provider and the analytics data originated from an analytics provider; and generating an output of the first program using a result of the analytics function, where the output contains desensitized data.

8 Claims, 7 Drawing Sheets

(51) Int. Cl.
*H04L 9/08* (2006.01)
*G06F 8/41* (2018.01)

(56) References Cited

U.S. PATENT DOCUMENTS

| | | | |
|---|---|---|---|
| 9,935,765 B2* | 4/2018 | Weaver | G16H 50/30 |
| 2009/0132419 A1 | 5/2009 | Grammer et al. | |
| 2012/0272329 A1 | 10/2012 | Grammer et al. | |
| 2017/0109542 A1* | 4/2017 | Kang | G06F 21/602 |
| 2019/0294819 A1* | 9/2019 | Roake | G06F 21/6254 |
| 2020/0082922 A1* | 3/2020 | Bacastow | H04L 63/10 |

FOREIGN PATENT DOCUMENTS

| | | | |
|---|---|---|---|
| CN | 108846292 A | 11/2018 | |
| WO | 2014137449 A2 | 9/2014 | |
| WO | 2017187207 A1 | 11/2017 | |

OTHER PUBLICATIONS

Disclosed Anonymously, "A method uses dynamic anonymization to protect customer sensitive data during analytics", IP.com No. IPCOM000249015D, IP.com Electronic Publication Date: Jan. 26, 2017, 7 pages.

Uzun et al., "Privacy Technologies in the Era of Big Data: Reflections & New Directions", PARC, 2017, 57 pages.

Hasan et al., "Secure Count Query on Encrypted Genomic Data", arXiv:1703.01534v1 [cs.CR], Mar. 4, 2017, 19 pages.

Mell et al., "The NIST Definition of Cloud Computing", Recommendations of the National Institute of Standards and Technology, Special Publication 800-145, Sep. 2011, 7 pages.

Linton et al., "Private Analytics Using Multi-Party Computation," U.S. Appl. No. 16/516,605, filed Jul. 19, 2019.

List of IBM Patents or Patent Applications Treated as Related, Dated Jul. 18, 2019, 2 pages.

* cited by examiner

PRIVATE ANALYTICS USING MULTI-PARTY COMPUTATION

BACKGROUND

The present disclosure relates to sensitive data, and more specifically to performing strong desensitization of sensitive data within a garbled circuit.

Sensitive data may be shared between various companies for a mutual benefit. More specifically, some companies may have sensitive data that a separate company wants to analyze or run diagnostics on. In some instances, the data that is shared between companies contains personal information. Regulations to protect personal information from being shared (e.g., General Data Privacy Regulation (GDPR) in Europe) are being enacted, which limits the amount of data analysis or prevents the analysis all together when the data contains personal information. For example, the GDPR specifies onerous privacy controls on any data which contains personal information. These regulations are increasing and becoming stricter, which makes it harder and more difficult for companies to share data and analyze sensitive information. With these data regulations, only data which is thoroughly cleansed of personally identifiable information can be used freely.

SUMMARY

The present invention provides a computer-implemented method, system, and computer program product to perform strong desensitization of sensitive data within a garbled circuit. The method may include compiling a predetermined program into a first program, where the compiled first program is encoded in a form of a garbled circuit, and where the predetermined program runs on sensitive data. The method may also include executing the first program, where executing the first program includes: executing an analytics function using tokenized data with a first set of sensitive information and analytics data with a second set of sensitive information, where the tokenized data originated from a data provider and the analytics data originated from an analytics provider; and generating an output of the first program using a result of the analytics function, where the output contains desensitized data. The method of the present invention may strongly preserve individual user data privacy as well as simplify, and increase the efficiency of, the desensitization. Additionally, executing the first program may optionally include, in response to executing the analytics function, desensitizing the result of the analytics function using a statistical desensitization technique, where the desensitizing includes obscuring the first set of sensitive information and the second set of sensitive information. The desensitizing may help make sure that it is not possible to re-identify any individual represented in an original data set. The method may optionally include encrypting the output, where one of the data provider and the analytics provider is an owning party and one is a non-owning party, and encrypting the output includes: receiving an encryption key from the owning party, and encrypting the output using the encryption key. Encrypting the output may prevent unnecessary parties from viewing the output once it is outside of the garbled circuit.

The system to perform strong desensitization of sensitive data within a garbled circuit may have one or more computer processors and may be configured to compile a predetermined program into a first program, where the compiled first program is encoded in a form of a garbled circuit, and where the predetermined program runs on sensitive data. The system may also be configured to execute the first program, where executing the first program includes: executing an analytics function using tokenized data with a first set of sensitive information and analytics data with a second set of sensitive information, where the tokenized data originated from a data provider and the analytics data originated from an analytics provider; and generating an output of the first program using a result of the analytics function, where the output contains desensitized data. The system of the present invention may strongly preserve individual user data privacy as well as simplify, and increase the efficiency of, the desensitization. Additionally, executing the first program may optionally include, in response to executing the analytics function, desensitizing the result of the analytics function using a statistical desensitization technique, where the desensitizing includes obscuring the first set of sensitive information and the second set of sensitive information. The desensitizing may help make sure that it is not possible to re-identify any individual represented in an original data set. The system may optionally be configured to encrypt the output, where one of the data provider and the analytics provider is an owning party and one is a non-owning party, and encrypting the output includes: receiving an encryption key from the owning party, and encrypting the output using the encryption key. Encrypting the output may prevent unnecessary parties from viewing the output once it is outside of the garbled circuit.

The computer program product to perform strong desensitization of sensitive data within a garbled circuit may include a computer readable storage medium having program instructions embodied therewith, the program instructions executable by a server to cause the server to perform a method, the method including: compiling a predetermined program into a first program, where the compiled first program is encoded in a form of a garbled circuit, and where the predetermined program runs on sensitive data; and executing the first program, where executing the first program includes: executing an analytics function using tokenized data with a first set of sensitive information and analytics data with a second set of sensitive information, where the tokenized data originated from a data provider and the analytics data originated from an analytics provider; and generating an output of the first program using a result of the analytics function, where the output contains desensitized data. The computer program product of the present invention may strongly preserve individual user data privacy as well as simplify, and increase the efficiency of, the desensitization. Additionally, executing the first program may optionally include, in response to executing the analytics function, desensitizing the result of the analytics function using a statistical desensitization technique, where the desensitizing includes obscuring the first set of sensitive information and the second set of sensitive information. The desensitizing may help make sure that it is not possible to re-identify any individual represented in an original data set. The method may optionally include encrypting the output, where one of the data provider and the analytics provider is an owning party and one is a non-owning party, and encrypting the output includes: receiving an encryption key from the owning party, and encrypting the output using the encryption key. Encrypting the output may prevent unnecessary parties from viewing the output once it is outside of the garbled circuit.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
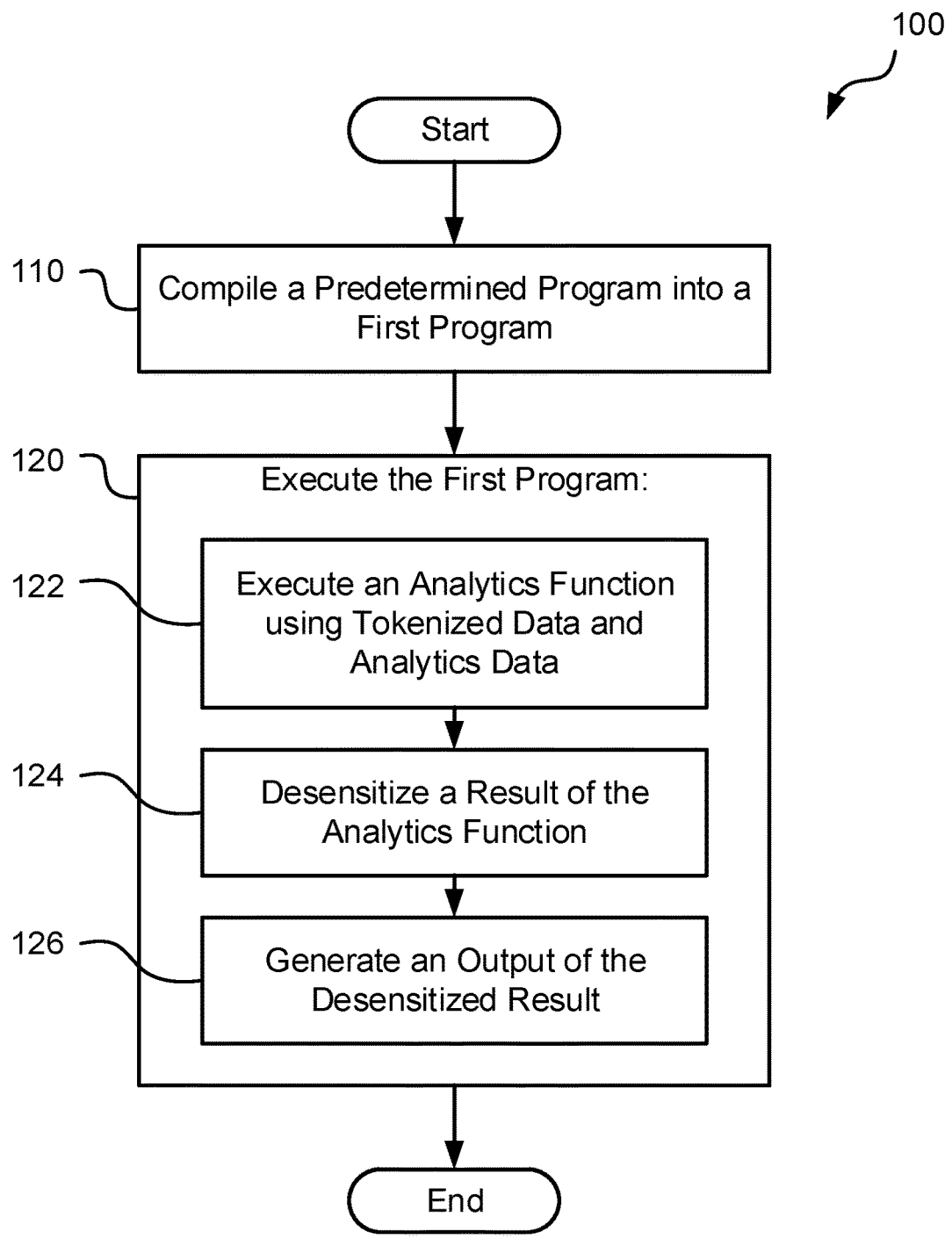
FIG. 1 depicts a flowchart of a set of operations for performing strong desensitization of data within a garbled circuit, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to sensitive data, and more specifically to performing strong desensitization of sensitive data within a garbled circuit. While the present disclosure is not necessarily limited to such applications, various aspects of the disclosure may be appreciated through a discussion of various examples using this context.

The present disclosure provides a computer-implemented method, system, and computer program product for performing strong desensitization of sensitive data within a garbled circuit. In some embodiments, a garbled circuit is a program that is compiled into two matching halves, or pairs, of a program and each half maintains ownership of the sensitive data for that half. In some embodiments, one half of the program is configured as a client and the other half of the program is configured as a server. Performing strong desensitization and an analytic task within the garbled circuit increases the likelihood that the output of the analytic task is strongly desensitized, while retaining a maximum value, or amount, of input data. Previous methods of trying to desensitize data have only been able to either strongly desensitize the data or retain the maximum value of input data (in other words, not losing any of the input data due to sensitive data), but not both. Due to increasing data regulations, most methods, or processes, of desensitizing data have had to lose some of the values of input data due to the input data containing sensitive information. Further, previous methods of trying to desensitize data have been complicated.

The strong desensitization of sensitive data along with analytics, or an analytic task, is performed in a synthetic hands-off environment in the form of a garbled circuit that is computed cooperatively between a provider of the analytic task (an analytic provider) and a provider of the data (a data provider). In some embodiments, both the analytic task as well as strong desensitization techniques are performed inside the garbled circuit program, such that individual user data privacy is strongly preserved and both providers' inputs are kept private from each other. Performing the strong desensitization techniques within the garbled circuit program may simplify, and increase the efficiency of, the desensitization. In some embodiments, the analytic provider executes one half of the garbled circuit program and the data provider executes a second matching half of the garbled circuit program.

Figure 5:
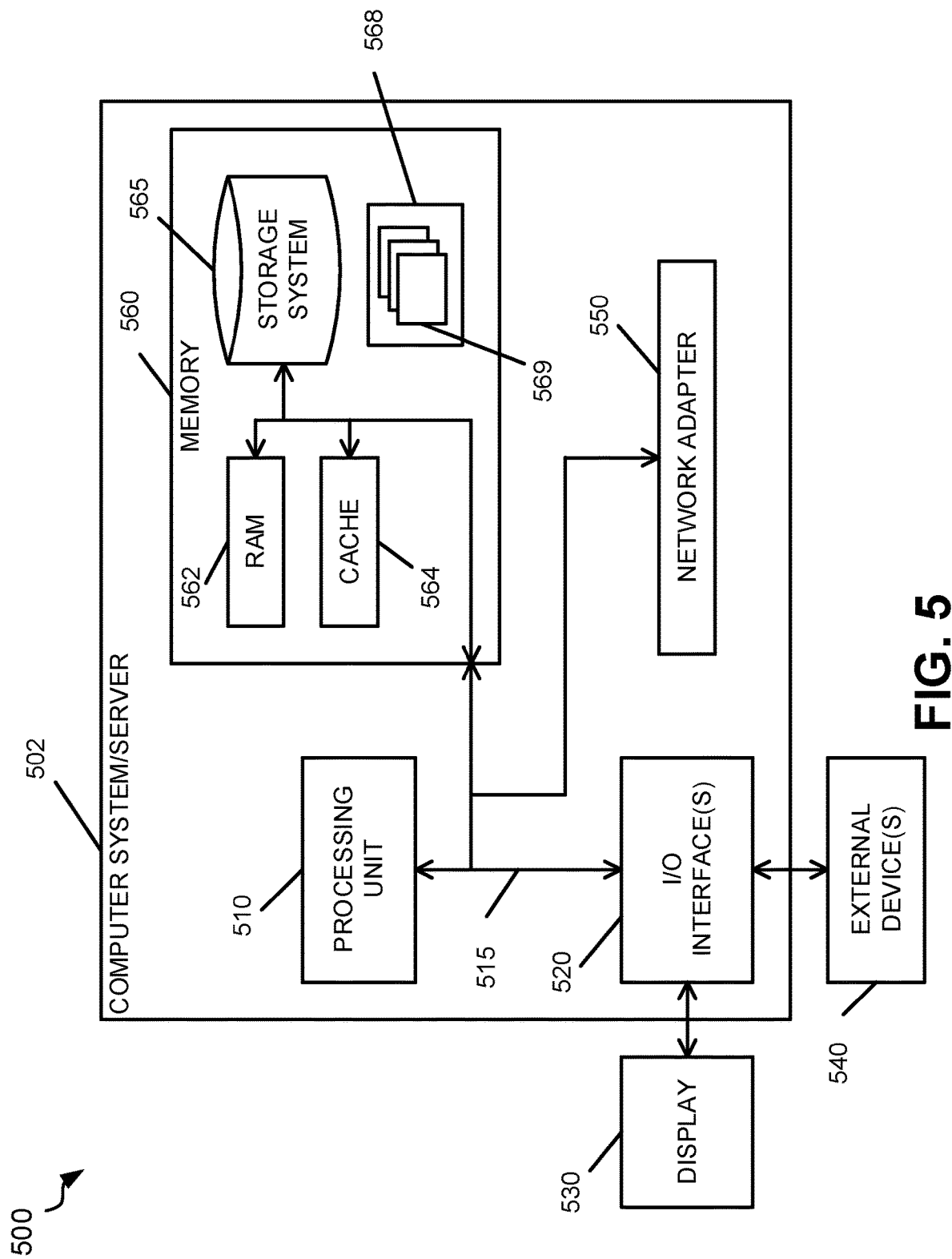
FIG. 5 depicts a block diagram of a sample computer system, according to some embodiments.

Referring now to FIG. 1, a flowchart illustrating a method 100 for performing strong desensitization of data within a garbled circuit is depicted, according to some embodiments. In some embodiments, the method 100 is implemented as a computer script or computer program (e.g., computer executable code) to be executed by a server (e.g., server 220 or server 230 (FIG. 2)), on or connected to a computer system (e.g., computer system 200 (FIG. 2) or computer system 500 (FIG. 5)). In some embodiments, the server is a computer device, such as computer system 200 (FIG. 2) or computer system/server 502 (FIG. 5).

In some embodiments, a server is configured to execute operation 110 to compile a predetermined program into a first program. In some embodiments, there are two parties (e.g., companies) who do not want to share data or information with each other but would like to use each other's data. For example, one party may have personal data, such as data about their users or customers, and a second party may have analytics data, such as data about analytics functions and processing. In this example, neither party may want to share their specific analytics information or personal data with the other party. In some embodiments, both parties communicate and agree on a program, herein a predetermined program, that allows each party to use each other's data without gaining control of the data. Agreeing on a program may include agreeing on a level of desensitization of the data, as well as the specific steps, or elements, of the program. In some embodiments, agreeing to the program includes agreeing on an analytics program that is applicable to the data. The analytics program may be a generic analytics program without any sensitive or proprietary analytics data.

Once the predetermined program is agreed upon between the parties, the program can then be compiled into a garbled circuit program in block 110. Compiling a program may include writing a program into two separate, matching, and executable programs (i.e., two halves of a program) that connect and share information between the two halves of the program. In other words, compiling the program may include encoding the predetermined program into a form of a garbled circuit. The garbled circuit may be the two separate, matching, and executable programs that connect and share information between the programs. In some embodiments, the matching programs share information through a network, such as within cloud computing environment 50 of FIG. 6. These two separate programs may be referred to herein as halves of a program, because both programs together make up the complete compiled program.

In some embodiments, a computer system includes both an analytics provider (i.e., a server for the analytics party) and a data provider (i.e., a server for the data party). In some embodiments, both the analytics provider and the data provider compile their own predetermined program. When both parties compile their own predetermined program, the predetermined program is identical for each party, therefore both parties should completely agree on all elements of the predetermined program.

In some embodiments, only one party compiles the predetermined program. In this embodiment, one party entrusts the other party to do the compiling. Once the program is compiled, the compiling party shares the compiled program with the second party. For example, the analytics provider may be entrusted to compile the predetermined program into a first program, and then the analytics provider sends the compiled program to the data provider. In another example, the data provider compiles the predetermined program into a first program and then sends the compiled program to the analytics provider.

In some embodiments, a server is configured to execute operation 120 to execute the first program. Executing the first program may include running the encoded program on the garbled circuit environment, or computer system (e.g., computer system 200), which includes both the data provider and the analytics provider. In some embodiments, executing the first program, or the encoded program, includes continuously exchanging data between the two parties when one half of the encoded program contacts the other over a network. Each of the data provider and the analytics provider may collaboratively compute an output of their program in the form of thousands of oblivious transfer operations over the network. In some embodiments, by compiling, or encoding, the predetermined program into the form of a garbled circuit, any inputs by either party are encoded into their half of the garbled circuit. This is functionally equivalent to encrypting the data. In some embodiments, the two halves of the first program communicate over the network using the oblivious transfer operations, which prevents any recoverable forms of the input data from being communicated between the two halves of the program.

In some embodiments, executing the first program includes operation 122 to execute an analytics function using tokenized data and analytics data. The tokenized data may include a first set of sensitive information and may originate from a data provider. The analytics data may include a second set of sensitive information and may originate from an analytics provider. In some embodiments, the analytics function is a generic analytics program, or function, that has been agreed upon by both the data provider and the analytics provider. In some embodiments, the analytics function is machine learning, or a deep neural net, that is encoded into the garbled circuit program. The neural net may be used in order to perform inferencing against the data input of the data provider. In some embodiments, the weights and biases for the neural net are provided as analytics data. In some embodiments, the analytics function may be any cognitive or analytics program that is useful to run on sensitive data (e.g., machine learning, predictive analytics, data mining, predictive modelling, or any other analytics technique). In some embodiments, analytics data includes any private or sensitive data relating to the analytics function that is necessary to execute the analytics function. For example, the analytics data may be specific variables for the analytics function.

In some embodiments, the data provider inputs tokenized data into the compiled first program. Tokenized data may include data that has been replaced with a hash of the original data or replaced using a similar uniform one-way function that replaces two or more instances of the same value with identical pseudorandom tokens. In some embodiments, the sensitive data elements in the data provider's input data are tokenized. Sensitive data elements may include name, social security number, bank account numbers, medical record numbers, birthday, addresses, payment card information, usernames and passwords, etc. Tokenizing the data provider's input data may obscure the sensitive data elements of the input data, but also preserves the ability to make correlations across data records, which may be necessary for the analytics function. Tokenizing the input data may help ensure that the output of the garbled circuit program, or the first program, contains only data that is fully desensitized.

In some embodiments, the data provider tokenizes the input data before the first program is executed. In other embodiments, the data tokenization is part of the first program, which means that it takes place inside of the garbled circuit. In some embodiments, if the data is tokenized inside of the garbled circuit program, then the analytics provider helps, using oblivious transfer operations, tokenize the input data. In some embodiments, it is more efficient to tokenize the input data before the first program is executed because there may not be any benefit to having the analytics provider help tokenize the data, therefore having only the data provider tokenize the data reduces processing power and time (i.e., increases the efficiency).

In some embodiments, executing the first program includes operation 124 to further desensitize a result of the analytics function. The analytics function has a result that is outputted after executing the analytics function. In some embodiments, to make sure that no sensitive information is recovered at the end of the first program, the first program may further desensitize the result of the analytics function. Desensitizing the result may include running the result, or the output, through one or more statistical desensitization routines. Statistical desensitization may be a process of encrypting or removing sensitive information from data sets. In some embodiments, the statistical desensitization routine may be embodied as one or more of k-anonymity, l-diversity, t-closeness, differential privacy, or similar functions which guarantee that the results of the analytic task do not make possible the re-identification of data pertaining to any individual represented in the original data set (e.g., the tokenized data from the data provider, input data from the data provider, and/or analytics data from the analytics provider).

In some embodiments, executing the first program includes operation 126 to generate an output of the first program, the output containing desensitized data. In some embodiments, operation 126 includes generating an output of the desensitized result of operation 124. Generating an output may include determining a final output of the compiled program after the result of the analytics function has been desensitized. The output may be an output of the garbled circuit and may be visible to the participating parties. In some embodiments, the first program, or the garbled circuit program, executes opaquely for both parties, due to the thousands of oblivious transfer operations, and all calculations and operations of the first program are hidden from both parties until the output is generated. Because the operations (e.g., operations 122, 124, and 126) are performed in the garbled circuit program, neither party is able to discern any meaningful information from the intermediate steps of the program, therefore privacy for each party is preserved and the output of the analytics function and the first program is desensitized. Once the output of the garbled circuit program is generated and sent out (of the garbled circuit), the output may be visible by both parties. In some embodiments, the output does not include any sensitive or personal information because the computing steps were all executed within a garbled circuit (which garbles, or encrypts, the steps), the results were desensitized, and all input data was encoded within the garbled circuit (which, again, garbles or encrypts the input data so that it is not recoverable by the other party).

In some embodiments, only one party may want, or have the rights to, the output of the garbled circuit program. For example, even though the output does not contain any sensitive or personal information, the output may contain proprietary information for one of the parties, and therefore the party that owns the proprietary information (i.e., owning party) may not want the output visible to the second party. In some embodiments, the garbled circuit environment may be configured such that only the owning party receives the output. For instance, there may be a switch within the compiler that specifies whether the output only goes to one of the parties.

In some embodiments, the first program further includes an encryption step that encrypts the output before it has left the garbled circuit. Encrypting the output is further discussed herein and depicted in FIG. 3 and FIG. 4.

Figure 2:
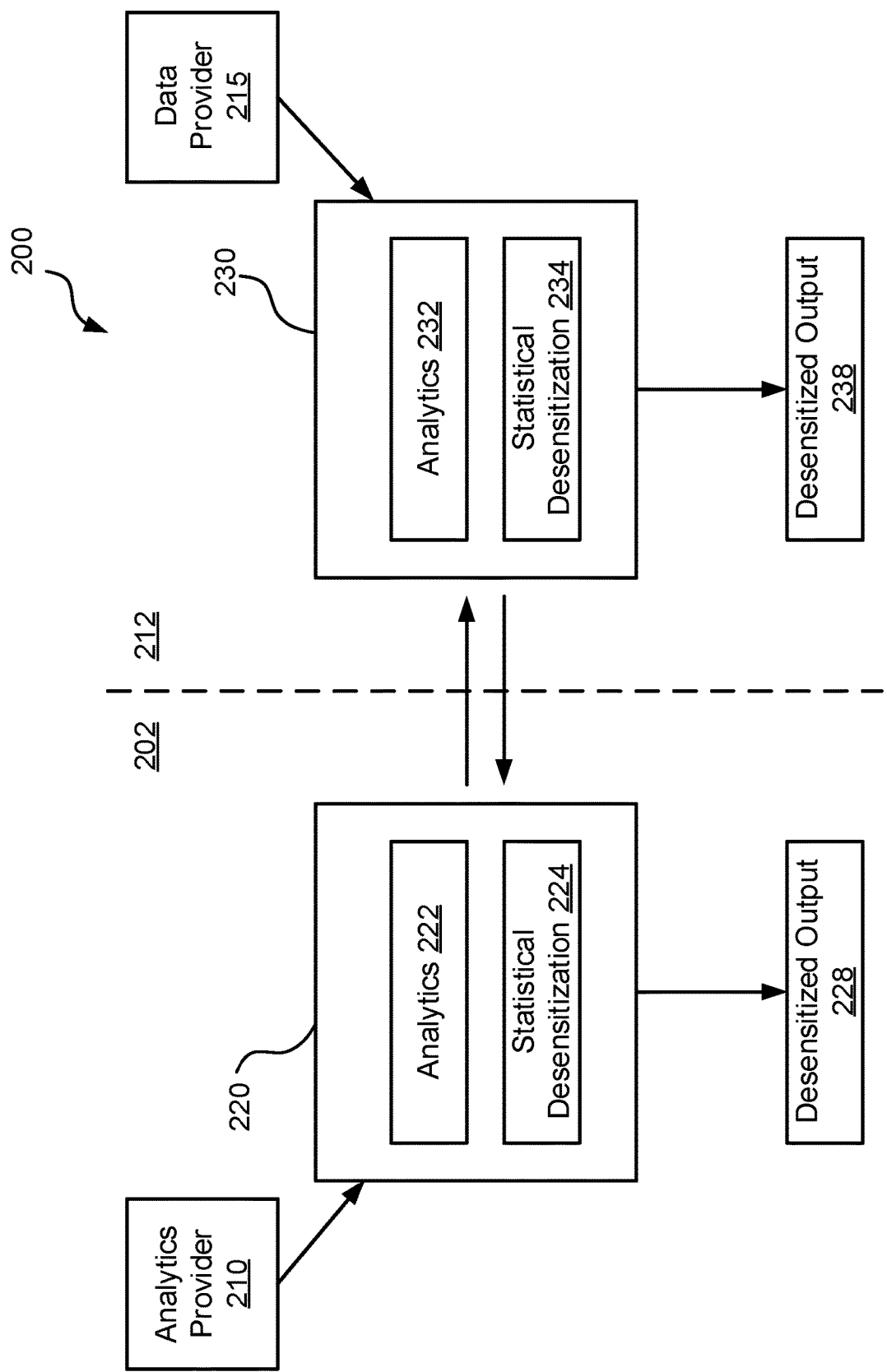
FIG. 2 depicts a block diagram of an example computer system executing a garbled circuit, according to some embodiments.

Referring to FIG. 2, a block diagram of an example computer system 200 executing a garbled circuit is depicted, according to some embodiments. Computer system 200 is one possible computer system capable of performing strong desensitization of data within a garbled circuit and is illustrated for example purposes. In some embodiments, computer system 200 may be referred to as a garbled circuit environment.

System 200 may include an analytics provider 210 and a data provider 215. In some embodiments, analytics provider 210 is a server owned by, or used by, an analytics party that has the analytics data and data provider 215 is a server owned by, or used by, a data party that has the tokenized data and/or the input data. In some embodiments, the analytics provider 210 performs a first half 220 of the first program and the data provider 215 performs a second half 230 of the first program. As discussed herein the first half 220 and the second half 230 may be matching programs that, when combined, make up the garbled circuit program. The first half 220 and second half 230 of the first program include matching steps of analytics 222 and analytics 232, as well as statistical desensitization 224 and statistical desensitization 234. In some embodiments, analytics 222 and 232 correspond with operation 122 of FIG. 1. In some embodiments, statistical desensitization 224 and 234 correspond with operation 124 of FIG. 1.

In some embodiments, the analytics provider 210 and the data provider 215 may have a desensitized output 228 and 238, respectively. The desensitized output 228 and 238 may be outputted from the garbled circuit program (made up of the first half 220 and the second half 230) and may be visible by the analytics provider 210 and the data provider 215 respectively. The desensitized output 228 and 238 may correspond to operation 126 of FIG. 1.

In some embodiments, the garbled circuit environment 200 includes both the analytics provider premises 202 and the data provider premises 212. The analytics provider 210 may be a part of the analytics provider premises 202 and the data provider 215 may be part of the data provider premises 212. In some embodiments, the analytics provider premises 202 may be a public cloud. In some embodiments, the data provider premises 212 may be an enterprise data center. When executing the garbled circuit program, data may be continuously exchanged across the analytics provider premises 202 and the data provider premises 212 (i.e., from the analytics provider 210 to the data provider 215) through a network using the oblivious transfer operations.

Figure 3:
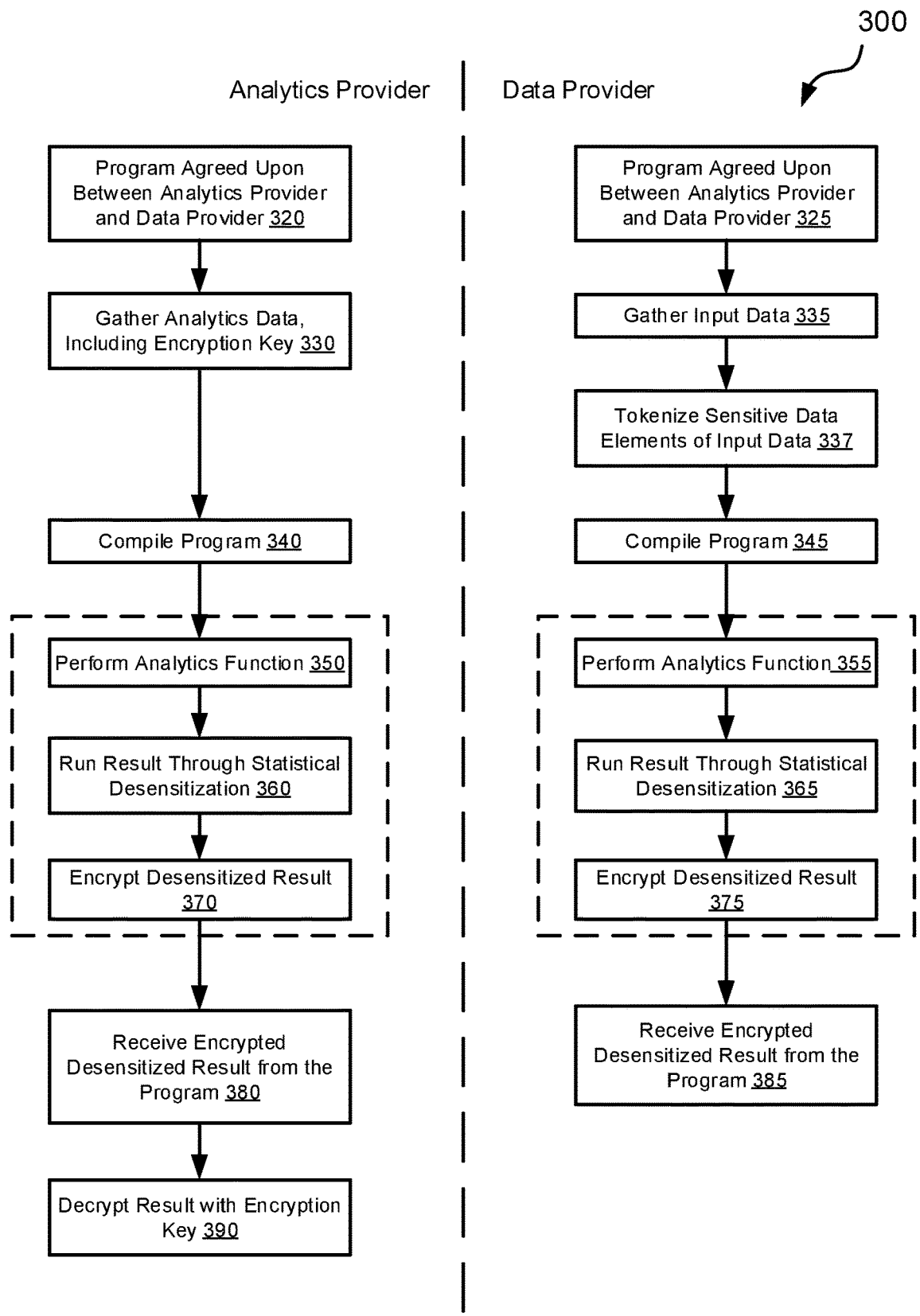
FIG. 3 depicts a flowchart of a set of operations for encrypting data such that the data provider does not see a desensitized result, according to some embodiments.

Referring to FIG. 3, a flowchart illustrating a method 300 for encrypting data such that the data provider does not see a desensitized result is depicted, according to some embodiments. As discussed herein, there may be circumstances that only one of the parties can view the output of the garbled circuit program, for example due to proprietary information. FIG. 3 depicts a situation where the analytics provider is the owning party (in other words owns, the analytics provider owns the information in the output), and the data provider is the non-owning party, (in other words, the data provider does not own the information in the output).

In some embodiments, method 300 is executed across both an analytics provider and a data provider, which are both a part of a computer system or a garbled circuit environment. In some embodiments, an analytics provider receives a program that has been agreed upon between the two parties in operation 320. In operation 330, the analytics provider may gather all necessary analytics data, including an encryption key, in order to execute the predetermined, or agreed upon, program.

In operation 340, the analytics provider compiles the analytics provider half of the predetermined program. The analytics provider half of the program may be matching with the data provider half of the program. Operation 340 may correspond to operation 110 of FIG. 1.

After compiling the program 340, the analytics provider may execute the program within the garbled circuit by performing an analytics function 350, running the result of the analytics function through statistical desensitization 360, and encrypting the desensitized result 370. Operations 350 and 360 may correspond to operations 122 and 124 of FIG. 1 respectively. In some embodiments, encrypting the desensitized result 370 is done using the encryption key provided by the analytics provider.

The encrypted desensitized result is then outputted from the garbled circuit program and is then received, or made visible, by the analytics provider at operation 380. Because the analytics provider has the encryption key, the analytics provider may decrypt the encrypted output so that the result is readable by the analytics provider at operation 390.

While the analytics provider is performing some steps of the method 300, the data provider is also performing various steps, or operations, of method 300. Like the analytics provider, the data provider also receives a program that has been agreed upon between the two parties in operation 325. Once the program is received, the data provider gathers all relevant input data 335 that may be necessary to execute the program. The data provider may tokenize the sensitive data elements of the input data, in operation 337. Like the analytics provider, the data provider compiles its half of the predetermined program in operation 345. Operation 345 may correspond to operation 110 in FIG. 1.

Once the program is compiled, the data provider may execute the program within a garbled circuit by performing an analytics function 355, running the result of the analytics function through statistical desensitization 365, and encrypting the desensitized result 375. Operations 355 and 365 may correspond to operations 122 and 124 of FIG. 1 respectively. Operations 350, 360, and 370 are matching with operations 355, 365, and 375. Because the data provider is encrypting the desensitized result 375 within the garbled circuit program, the data provider may receive the encryption key from the analytics provider using oblivious transfer operations. This way, the data provider can use the encryption key to encrypt the desensitized result but will not be able to recover the encryption key outside of the garbled circuit program. In some embodiments, the data provider receives, or is able to view, the encrypted desensitized result from the program at operation 385, but the data provider cannot read the encrypted desensitized result because the data provider does not have the encryption key, nor can the data provider recover the encryption key used in the garbled circuit program, due to the nature of the garbled circuit.

Figure 4:
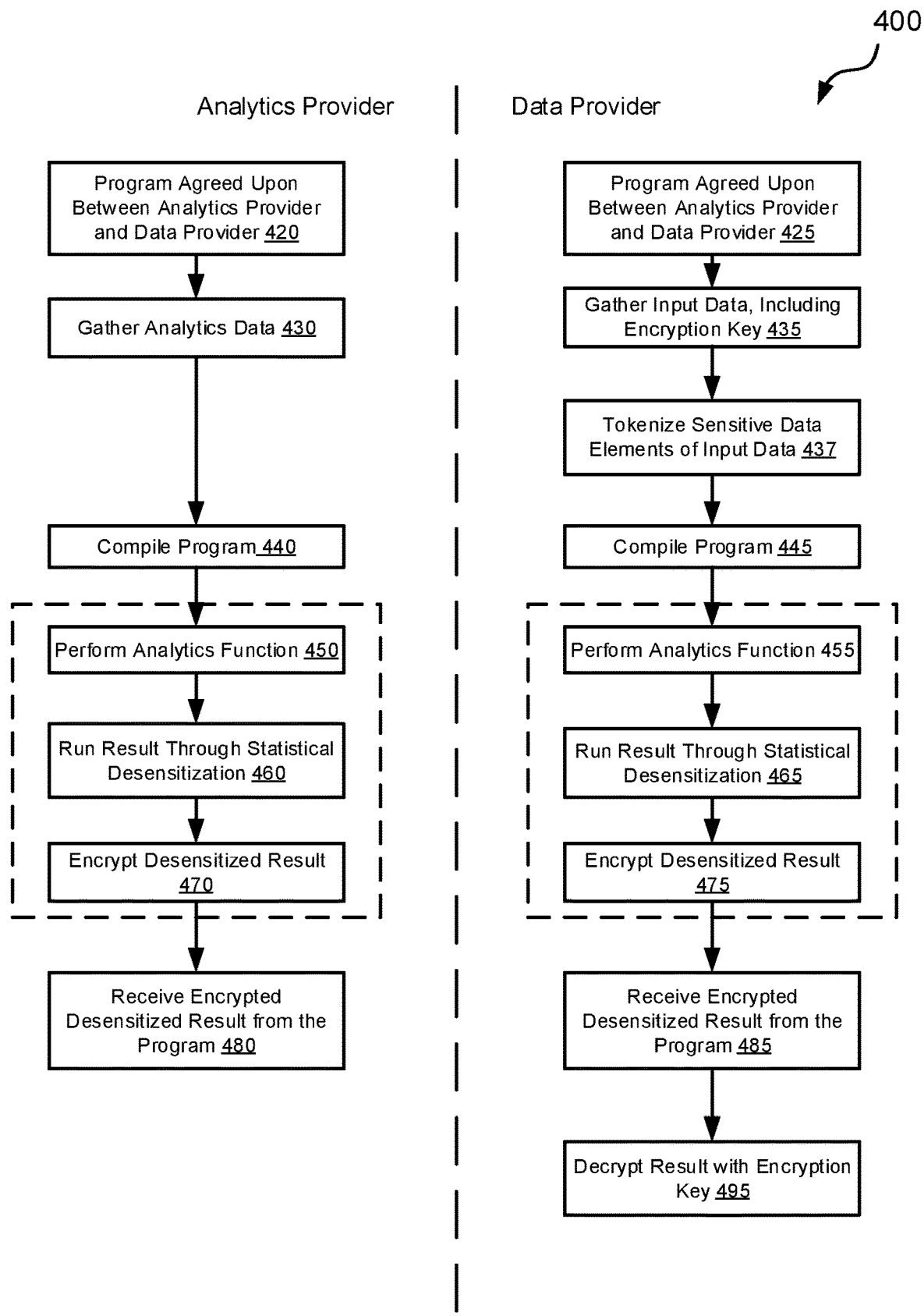
FIG. 4 depicts a flowchart of a set of operations for encrypting data such that the analytics provider does not see a desensitized result, according to some embodiments.

Referring to FIG. 4, a flowchart illustrating a method 400 for encrypting data such that the analytics provider does not see a desensitized result is depicted, according to some embodiments. As discussed herein, there may be circumstances that only one of the parties can view the output of the garbled circuit program, for example due to proprietary information. FIG. 4 depicts a situation where the data provider is the owning party, in other words the data provider owns the information in the output.

In some embodiments, method 400 is executed across both an analytics provider and a data provider, which are both a part of a computer system or a garbled circuit environment. In some embodiments, an analytics provider receives a program that has been agreed upon between the two parties in operation 420. In operation 430, the analytics provider may gather all necessary analytics data in order to execute the predetermined, or agreed upon, program.

In operation 440, the analytics provider compiles the analytics provider half of the predetermined program. The analytics provider half of the program must be matching with the data provider half of the program. Operation 440 may correspond to operation 110 of FIG. 1.

After compiling the program 440, the analytics provider may execute the program within the garbled circuit by performing an analytics function 450, running the result of the analytics function through statistical desensitization 460, and encrypting the desensitized result 470. Operations 450 and 460 may correspond to operations 122 and 124 of FIG. 1 respectively. In some embodiments, encrypting the desensitized result 370 is done using the encryption key provided by the data provider. Because the analytics provider is encrypting the desensitized result 470 within the garbled circuit program, the analytics provider may receive the encryption key from the data provider using oblivious transfer operations. This way, the analytics provider can use the encryption key to encrypt the desensitized result but will not be able to recover the encryption key outside of the garbled circuit program. In some embodiments, the analytics provider receives, or is able to view, the encrypted desensitized result from the program at operation 480, but the analytics provider cannot read the encrypted desensitized result because the analytics provider does not have the encryption key, nor can the analytics provider recover the encryption key used in the garbled circuit program, due to the nature of the garbled circuit.

While the analytics provider is performing some steps of the method 400, the data provider is also performing various steps, or operations, of method 400. Like the analytics provider, the data provider also receives a program that has been agreed upon between the two parties in operation 425. Once the program is received, the data provider gathers all relevant input data, including the encryption key, 435 that may be necessary to execute the program. The data provider may tokenize the sensitive data elements of the input data, in operation 437. Like the analytics provider, the data provider compiles its half of the predetermined program in operation 445. Operation 445 may correspond to operation 110 in FIG. 1.

Once the program is compiled, the data provider may execute the program within a garbled circuit by performing an analytics function 455, running the result of the analytics function through statistical desensitization 465, and encrypting the desensitized result 475. Operations 455 and 465 may correspond to operations 122 and 124 of FIG. 1 respectively. Operations 450, 460, and 470 are matching with operations 455, 465, and 475.

The encrypted desensitized result 470 is then outputted from the garbled circuit program and is then received, or is visible, by the data provider at operation 485. Because the analytics provider has the encryption key, the analytics provider may decrypt the encrypted output so that the result is readable by the analytics provider at operation 495.

Referring to FIG. 5, computer system 500 is a computer system/server 502 is shown in the form of a general-purpose computing device, according to some embodiments. The components of computer system/server 502 may include, but are not limited to, one or more processors or processing units 510, a system memory 560, and a bus 515 that couple various system components including system memory 560 to processor 510.

Bus 515 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 560 can include computer system readable media in the form of volatile memory, such as random-access memory (RAM) 562 and/or cache memory 564. Computer system/server 502 may further include other removable/non-removable, volatile/non-volatile computer system storage media. By way of example only, storage system 565 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 515 by one or more data media interfaces. As will be further depicted and described below, memory 560 may include at least one program product having a set (e.g., at least one) of program modules that are configured to carry out the functions of embodiments of the invention.

Program/utility 568, having a set (at least one) of program modules 569, may be stored in memory 560 by way of example, and not limitation, as well as an operating system, one or more application programs, other program modules, and program data. Each of the operating system, one or more application programs, other program modules, and program data or some combination thereof, may include an implementation of a networking environment. Program modules 569 generally carry out the functions and/or methodologies of embodiments of the invention as described herein.

Computer system/server 502 may also communicate with one or more external devices 540 such as a keyboard, a pointing device, a display 530, etc.; one or more devices that enable a user to interact with computer system/server 502; and/or any devices (e.g., network card, modem, etc.) that enable computer system/server 502 to communicate with one or more other computing devices. Such communication can occur via Input/Output (I/O) interfaces 520. Still yet, computer system/server 502 can communicate with one or more networks such as a local area network (LAN), a general wide area network (WAN), and/or a public network (e.g., the Internet) via network adapter 550. As depicted, network adapter 550 communicates with the other components of computer system/server 502 via bus 515. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
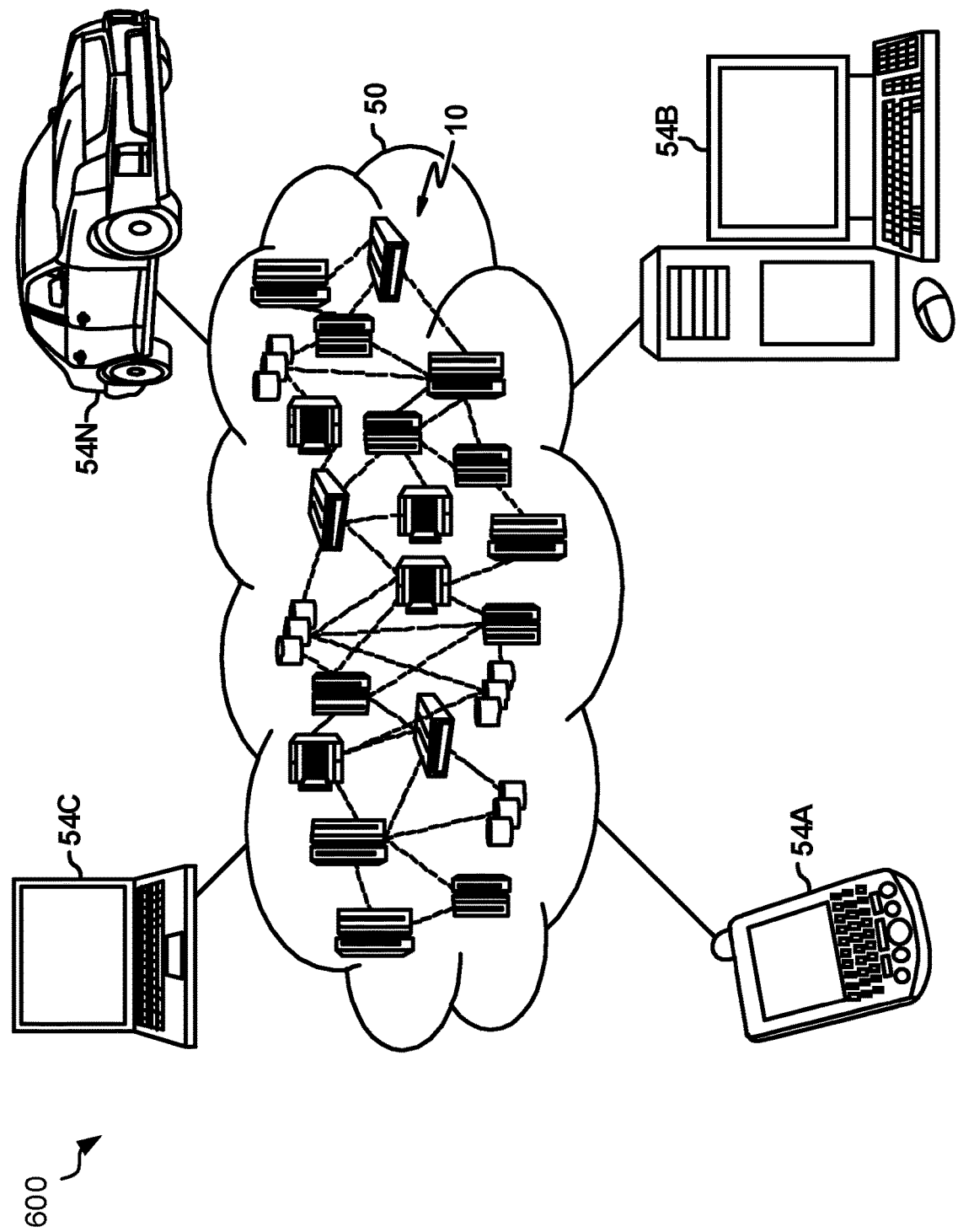
FIG. 6 depicts a cloud computing environment, according to some embodiments.

Referring now to FIG. 6, illustrative cloud computing environment 600 is depicted, according to some embodiments. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
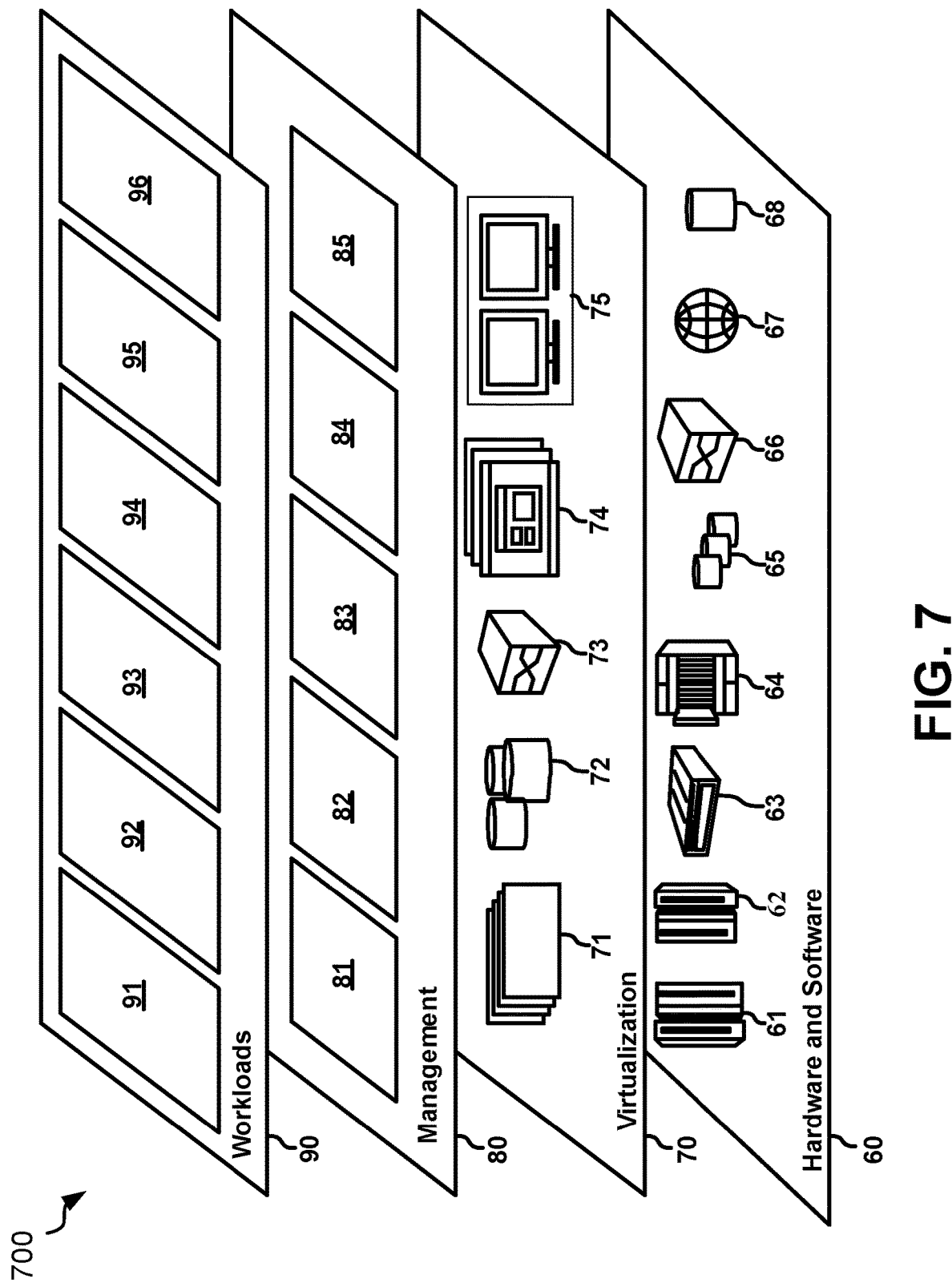
FIG. 7 depicts abstraction model layers, according to some embodiments.

Referring now to FIG. 7, a set of functional abstraction layers 700 provided by cloud computing environment 50 (FIG. 6) is shown, according to some embodiments. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data desensitization processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
one or more computer processors; and
a memory,
wherein the system is configured to:
compile a predetermined program into a first program, wherein the compiled first program is encoded in a form of a garbled circuit, and wherein the predetermined program runs on sensitive data; and
execute the first program, wherein executing the first program comprises:
executing an analytics function using tokenized data with a first set of sensitive information and analytics data with a second set of sensitive information, wherein:
the tokenized data originated from a data provider and the analytics data originated from an analytics provider,
the tokenized data includes sensitive data elements that have been obscured, and
executing the analytics function comprises executing a first matched analytics function on the analytics provider and a second matched analytics function on the data provider, and
generating an output of the first program using a result of the analytics function, wherein the output contains desensitized data.

2. The system of claim 1, wherein executing the first program further comprises:
in response to executing the analytics function, desensitizing the result of the analytics function using a statistical desensitization technique, wherein the desensitizing comprises obscuring the first set of sensitive information and the second set of sensitive information.

3. The system of claim 1, wherein executing the first program further comprises encrypting the output.

4. The system of claim 3, wherein:
one of the data provider and the analytics provider is an owning party and one is a non-owning party, and
encrypting the output comprises:
receiving an encryption key from the owning party, and
encrypting the output using the encryption key.

5. A computer program product comprising a computer readable storage medium having program instructions embodied therewith, the program instructions executable by a server to cause the server to perform a method, the method comprising:
compiling a predetermined program into a first program, wherein the compiled first program is encoded in a form of a garbled circuit, and wherein the predetermined program runs on sensitive data; and
executing the first program, wherein executing the first program comprises:
executing an analytics function using tokenized data with a first set of sensitive information and analytics data with a second set of sensitive information, wherein:
the tokenized data originated from a data provider and the analytics data originated from an analytics provider,
the tokenized data includes sensitive data elements that have been obscured, and
executing the analytics function comprises executing a first matched analytics function on the analytics provider and a second matched analytics function on the data provider, and
generating an output of the first program using a result of the analytics function, wherein the output contains desensitized data.

6. The computer program product of claim 5, wherein executing the first program further comprises:
in response to executing the analytics function, desensitizing the result of the analytics function using a statistical desensitization technique, wherein the desensitizing comprises obscuring the first set of sensitive information and the second set of sensitive information.

7. The computer program product of claim 5, wherein executing the first program further comprises encrypting the output.

8. The computer program product of claim 7, wherein:
one of the data provider and the analytics provider is an owning party and one is a non-owning party, and
encrypting the output comprises:
receiving an encryption key from the owning party, and
encrypting the output using the encryption key.

* * * * *